(12) United States Patent
Matsumoto et al.

(10) Patent No.: US 8,592,514 B2
(45) Date of Patent: Nov. 26, 2013

(54) URETHANE (METH) ACRYLATE RESIN COMPOSITION AND COATING MATERIAL USING THE SAME

(75) Inventors: Takashi Matsumoto, Osaka (JP); Toshio Mita, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/695,983

(22) PCT Filed: Apr. 26, 2011

(86) PCT No.: PCT/JP2011/060109
§ 371 (c)(1),
(2), (4) Date: Jan. 7, 2013

(87) PCT Pub. No.: WO2011/158566
PCT Pub. Date: Dec. 22, 2011

(65) Prior Publication Data
US 2013/0144000 A1    Jun. 6, 2013

(51) Int. Cl.
*C08L 75/00* (2006.01)
*C08L 91/08* (2006.01)
*C08K 5/01* (2006.01)

(52) U.S. Cl.
USPC ............................ 524/507; 524/487; 524/490

(58) Field of Classification Search
USPC .......................................... 524/507, 487, 490
See application file for complete search history.

(56) References Cited

U.S. PATENT DOCUMENTS

2009/0011367 A1 *   1/2009   Omatsu et al. ............. 430/287.1

FOREIGN PATENT DOCUMENTS

| JP | 11-209628 A | 8/1999 |
| JP | 2002-234921 A | 8/2002 |
| JP | 2004-323860 A | 11/2004 |
| JP | 2007-084601 A | 4/2007 |
| JP | 2008-106169 A | 5/2008 |
| JP | 2010-106122 A | 5/2010 |

OTHER PUBLICATIONS

International Search Report of PCT/JP2011/060109, mailing date Aug. 2, 2011.

* cited by examiner

*Primary Examiner* — Ling Choi
*Assistant Examiner* — Aiqun Li
(74) *Attorney, Agent, or Firm* — Westerman, Hattori, Daniels & Adrian, LLP

(57) ABSTRACT

The present invention aims to provide a urethane (meth) acrylate composition that forms a coating film with excellent surface-drying property at ordinary temperature through four seasons, slidability, and pinhole resistance (formation of a coating film that is free from pinholes), and a coating material using the urethane (meth)acrylate composition. The present invention provides a urethane (meth)acrylate resin composition including a urethane (meth)acrylate resin (A), a polymerizable unsaturated monomer (B), a paraffin wax (C), and an ethylene-α-olefin co-oligomer (D). The mass ratio of the paraffin wax (C) to the ethylene-α-olefin co-oligomer (D) is 0.05 to 50. The present invention also provides a coating material using the urethane (meth)acrylate composition.

4 Claims, No Drawings

URETHANE (METH) ACRYLATE RESIN COMPOSITION AND COATING MATERIAL USING THE SAME

TECHNICAL FIELD

The present invention relates to a urethane (meth)acrylate composition that forms a coating film with excellent surface-drying property, slidability, and pinhole resistance, and to a coating material using the urethane (meth)acrylate composition.

BACKGROUND ART

In recent years, urethane (meth)acrylate resins have been known as waterproofing building materials. Urethane (meth)acrylate resins with improved strength and durability in addition to an elongation percentage and flexibility have been known. (PTL 1)

Since such radical-curable urethane (meth)acrylate resins are used as layers for waterproofing coating films, which have a film thickness of 1 mm or more, the surface-drying property of the radical-curable urethane (meth)acrylate resin are improved by adding a paraffin wax. However, since the temperature varies greatly from season to season, currently, the formulation of paraffin wax and the like is changed from season to season so as to accommodate the seasonal temperature variations. Therefore, a urethane (meth)acrylate resin composition used for a coating material that is free from the surface-drying property at ordinary temperature and pinholes has been demanded.

CITATION LIST

Patent Literature

PTL 1: Japanese Unexamined Patent Application Publication No. 2010-106122

SUMMARY OF INVENTION

Technical Problem

An object of the present invention is to provide a urethane (meth)acrylate composition that forms a coating film with excellent surface-drying property at ordinary temperature through four seasons, slidability, and pinhole resistance (formation of a coating film that is free from pinholes), and a coating material using the urethane (meth)acrylate composition.

Solution to Problem

As a result of intensive studies on the surface-drying property and pinhole resistance of a urethane (meth)acrylate resin composition including a paraffin wax and a curing accelerator, the present inventors have found that, by using a certain amount of a specific olefin oligomer to the amount of the paraffin wax, the surface-drying property and pinhole resistance can be improved. Thus, the present invention has been completed.

Specifically, the present invention provides a urethane (meth)acrylate resin composition including a urethane (meth) acrylate resin (A), a polymerizable unsaturated monomer (B), a paraffin wax (C), and an ethylene-α-olefin co-oligomer (D). The mass ratio of the paraffin wax (C) to the ethylene-α-olefin co-oligomer (D) is 0.05 to 50. The present invention also provides a coating material using the urethane (meth)acrylate resin composition.

Advantageous Effects of Invention

According to the present invention, by using a certain amount of a specific olefin oligomer to the amount of the paraffin wax, there can be provided a urethane (meth)acrylate resin composition with excellent surface-drying property, slidability of a coating film, and pinhole resistance, and a coating material using the urethane methacrylate resin composition.

DESCRIPTION OF EMBODIMENTS

A urethane (meth)acrylate resin (A) used in the present invention is obtained by reacting an isocyanate-terminated urethane prepolymer, which is obtained by reacting a polyether polyol (A-1) with a polyisocyanate (A-2), with a hydroxyalkyl (meth)acrylate (A-3). Other polyols such as polyester polyols, polyacrylic polyols, and polycarbonate polyols may be used in combination with the polyether polyol component used herein as long as the advantages of the present invention are not impaired.

The polyether polyol (A-1) is one or more selected from, for example, polytetramethylene glycol (PTMG), polyoxypropylene diol (hereinafter abbreviated as "PPG"), and polyoxyethylene diol. The number-average molecular weight is 650 to 3,000, preferably 650 to 2,000, and more preferably 1,000 to 2,000. If the number-average molecular weight of the component (A-1) is greater than 3,000, a poor result is obtained in a tensile adhesion test, and if the number-average molecular weight is less than 650, the $-10°$ C.×180-degree bending property is degraded, neither of which is preferable. Note that the number-average molecular weight of the polyether polyol (A-1) is a styrene equivalent molecular weight measured by gel permeation chromatography (GPC) using tetrahydrofuran as an eluent.

Examples of the polyisocyanate (A-2) include 2,4-tolylene diisocyanate, the isomers thereof, the mixtures of the isomers (hereinafter, abbreviated as "TDIs"), diphenylmethane diisocyanate, hexamethylene diisocyanate, isophorone diisocyanate, xylylene diisocyanate, hydrogenated xylylene diisocyanate, dicyclohexylmethane diisocyanate, tolidine diisocyanate, naphthalene diisocyanate, triphenylmethane triisocyanate, Burnock D-750, Crisvon NX (manufactured by DIC Corporation), Desmodur L (manufactured by Sumitomo Bayer Co., Ltd.), and Coronate L (manufactured by Nippon Polyurethane Industry Co., Ltd.). In particular, TDIs are preferably used.

Examples of the hydroxyalkyl (meth)acrylate (A-3) include 2-hydroxyethyl methacrylate, 2-hydroxypropyl methacrylate, 2-hydroxyethyl acrylate, 2-hydroxypropyl acrylate, 4-hydroxybutyl acrylate, and 4-hydroxybutyl methacrylate. The hydroxyalkyl (meth)acrylate (A-3) is preferably 2-hydroxyethyl methacrylate.

Polyhydric alcohol allyl ether compounds such as ethylene glycol monoallyl ether, diethylene glycol monoallyl ether, propylene glycol monoallyl ether, dipropylene glycol monoallyl ether, 1,2-butylene glycol monoallyl ether, trimethylolpropane diallyl ether, glycerol diallyl ether, and pentaerythritol triallyl ether can be used in combination with the component (A-3) as long as the advantages of the present invention are not impaired.

One or more selected from an epoxy (meth)acrylate resin derived from an addition reaction product of a publicly known epoxy resin and an unsaturated monobasic acid, a polyester (meth)acrylate resin derived from a polyester resin having acidic groups at both terminals and glycidyl (meth)acrylate, and an air-drying unsaturated resin may be used in combination with the urethane (meth)acrylate resin (A) as long as the advantages of the present invention are not impaired.

The polymerizable unsaturated monomer (B) is a (meth) acrylic compound, namely a (meth)acryloyl group-containing monomer. Examples of the (meth)acrylic compound include methyl acrylate, ethyl acrylate, n-butyl acrylate, isobutyl acrylate, t-butyl acrylate, 2-ethylhexyl acrylate, n-octyl acrylate, decyl acrylate, lauryl acrylate, stearyl acrylate, polycaprolactone acrylate, diethylene glycol monomethyl ether monoacrylate, dipropylene glycol monomethyl ether monoacrylate, 2-ethylhexyl carbitol acrylate, methyl methacrylate, ethyl methacrylate, n-butyl methacrylate, isobutyl methacrylate, t-butyl methacrylate, hexyl methacrylate, 2-ethylhexyl methacrylate, n-octyl methacrylate, decyl methacrylate, lauryl methacrylate, stearyl methacrylate, polycaprolactone methacrylate, diethylene glycol monomethyl ether monomethacrylate, dipropylene glycol monomethyl ether monomethacrylate, 2-ethylhexyl carbitol methacrylate, phenoxyethyl acrylate, phenol ethylene oxide (EO)-modified acrylate, nonylphenyl carbitol acrylate, nonylphenol EO-modified acrylate, phenoxypropyl acrylate, phenol propylene oxide (PO)-modified acrylate, nonylphenoxypropyl acrylate, nonylphenol PO-modified acrylate, acryloyloxyethyl phthalate, phenoxyethyl methacrylate, phenol EO-modified methacrylate, nonylphenyl carbitol methacrylate, nonylphenol EO-modified methacrylate, phenoxypropyl methacrylate, phenol PO-modified methacrylate, nonylphenoxypropyl methacrylate, nonylphenol PO-modified methacrylate, methacryloyloxyethyl phthalate, dicyclopentenyloxyethyl (meth) acrylate, and 2-hydroxyethyl (meth)acrylate. Among these, phenoxyethyl (meth)acrylate and dicyclopentenyloxyethyl (meth)acrylate, which have a molecular weight of 180 or more and low volatility, and 2-hydroxyethyl (meth)acrylate, which has a hydrogen bond and low volatility, are preferable. This is because, even if trace amounts of these compounds remain in a coating film in an unreacted state, they are less likely to serve as TVOCs. Moreover, reactive monomers such as styrene, vinyl acetate, vinyl toluene, and α-methyl toluene, which have unsaturated groups, can be used as long as the advantages of the present invention are not impaired.

A monomer having at least two ethylenically unsaturated groups per molecule, or preferably having two (meth)acryloyl groups may be used in combination with the polymerizable unsaturated monomer (B) as long as the advantages of the present invention are not impaired. By using such a monomer in combination with the polymerizable unsaturated monomer (B), abrasion resistance, scratch resistance, agitation resistance, chemical resistance, and the like of the surface of a cured product can be improved. Examples of the compound having at least two ethylenically unsaturated groups per molecule include alkanediol di(meth)acrylates such as ethylene glycol di(meth)acrylate, 1,2-propylene glycol di(meth)acrylate, 1,3-butylene glycol di(meth)acrylate, and 1,6-hexanediol di(meth)acrylate; and polyoxyalkylene glycol di(meth)acrylates such as dipropylene glycol di(meth) acrylate, triethylene glycol di(meth)acrylate, tetraethylene glycol di(meth)acrylate, and polyethylene glycol di(meth) acrylate. These may be used alone or in combination of two or more. In addition, divinylbenzene, diallyl phthalate, diallyl isophthalate, diallyl tetrabromophthalate, triallyl phthalate, and the like may also be used as long as the advantages of the present invention are not impaired.

The mixing ratio (mass %) of the urethane (meth)acrylate resin (A) to the polymerizable unsaturated monomer (B) is preferably (A)/(B)=30/70 to 70/30 (mass %), and more preferably 50/50 to 70/30 (mass %). If the component (A) is more than 70%, a resin composition has a high viscosity, resulting in poor workability, and if the component (A) is less than 30%, the physical properties of the cured product are degraded, neither of which is preferable.

The paraffin wax (C) is added as a component that assists drying of a coating film. As the paraffin wax (C), for example, petroleum wax or synthetic wax, namely, polyethylene wax, oxidized paraffin, or an alcohol-type wax can be used. A paraffin wax having a melting point of 115° F. to 155° F. (Fahrenheit) is preferable. Note that the term "melting point" means a melting point determined in accordance with JIS K 2235. It is preferable that the paraffin wax (C) be added so that the amount of paraffin wax (C) added is 500 to 10,000 ppm relative to the amount of the resin composition including 100 parts by mass in total of the components (A) and (B). Furthermore, in terms of surface-drying property and viscosity, it is more preferable that the amount of paraffin wax (C) added be 2,000 to 8,000 ppm.

The ethylene-α-olefin co-oligomer (D) is obtained by copolymerizing ethylene and α-olefin so that the number-average molecular weight is preferably 500 to 2,500, and more preferably 1,000 to 1,500. Examples of the α-olefin include propylene, 1-butene, 4-methyl-1-pentene, and 2-methyl-1-pentene. Common properties of ethylene-α-olefin co-oligomers include a specific gravity of preferably 0.80 to 0.90, a kinematic viscosity of preferably 20 to 600 cSt (kinematic viscosity at 100° C. according to JIS K 2283), and an iodine value of preferably 1.0 or less. Although an ethylene-α-olefin co-oligomer having a low kinematic viscosity has good mixing properties, this ethylene-α-olefin co-oligomer is less effective in terms of surface-drying property and pinhole resistance. An ethylene-α-olefin co-oligomer having a high kinematic viscosity has poor mixing properties, which consequently degrades an effect of this ethylene-α-olefin co-oligomer on surface-drying property, slidability of the coating film, and pinhole resistance. Thus, in the addition of the ethylene-α-olefin co-oligomer (D), the ethylene-α-olefin co-oligomer (D) is suitably selected in consideration of mixing and separation properties. Examples of a commercially available ethylene-α-olefin co-oligomer (D) satisfying the requirements described above include LUCANT HC-40 and HC-100 manufactured by Mitsui Chemicals, Inc. The amount of ethylene-α-olefin co-oligomer (C) added is 0.01 to 5 parts by mass and preferably 0.01 to 2 parts by mass relative to the amount of the resin composition including 100 parts by mass in total of the components (A) and (B). If the amount is less than 0.01 parts by mass, the effect of improving surface-drying property is small, and if the amount is more than 5 parts by mass, a large amount of the ethylene-α-olefin co-oligomer floats on the surface of the composition, which degrades slidability of the coating film and the adhesiveness to a topcoat. Note that the number-average molecular weight of the ethylene-α-olefin co-oligomer (D) is a styrene equivalent molecular weight measured by gel permeation chromatography (GPC) using tetrahydrofuran as an eluent.

In the present invention, a curing accelerator, a radical curing agent, a photo-radical initiator, or a polymerization inhibitor can be added in order to control the curing rate.

Examples of the curing accelerator include metallic soaps such as cobalt naphthenate, cobalt octoate, zinc octoate, vanadium octoate, copper naphthenate, and barium naphthenate; metal chelates such as vanadium acetylacetate, cobalt acetylacetate, and iron acetylacetonate; and amines including N,N- substituted anilines, N,N-substituted-p-toluidines, and 4-(N,N-substituted amino)benzaldehydes such as aniline, N,N-dimethylaniline, N,N-diethylaniline, p-toluidine, N,N-dimethyl-p-toluidine, N,N-bis(2-hydroxyethyl)-p-toluidine, 4-(N,N-dimethylamino)benzaldehyde, 4-[N,N-bis(2-hydroxyethyl)amino]benzaldehyde, 4-(N-methyl-N-hydroxyethylamino)benzaldehyde, N,N-bis(2-hydroxypropyl)-p-toluidine, N-ethyl-m-toluidine, triethanolamine, m-toluidine, diethylenetriamine, pyridine, phenylmorpholine, piperidine, N,N-bis(hydroxyethyl)aniline, and diethanolaniline. Among these, amines and metallic soaps, in particular cobalt compounds, are preferable. These curing accelerators may be used alone or in combination of two or more. This curing accelerator may be added to the resin composition in advance, or may be added at the time of use. The cobalt compounds are particularly preferable. Examples of such cobalt compounds include cobalt naphthenate and cobalt octoate. The amount of curing accelerator added is 0.1 to 5 parts by mass, preferably 0.1 to 3 parts by mass, and more preferably 0.3 to 1 part by mass relative to 100 parts by mass in total of the components (A) and (B).

The radical curing agent may be a publicly known radical curing agent serving as a radical polymerization initiator. Examples of the radical curing agent include organic peroxides. Specific examples of the organic peroxides include publicly known organic peroxides such as diacyl peroxides, peroxy esters, hydroperoxides, dialkyl peroxides, ketone peroxides, peroxy ketals, alkyl peresters, and percarbonates. It is preferable that the amount of radical curing agent used be 0.1 to 6 parts by mass relative to 100 parts by mass in total of the components (A) and (B) in the composition.

Examples of the photo-radical initiator, that is a photosensitizer, include benzoin ethers such as benzoin alkyl ethers; benzophenone; benzophenone derivatives such as benzil and methyl orthobenzoyl benzoate; acetophenone derivatives such as benzyl dimethyl ketal, 2,2-diethoxyacetophenone, 2-hydroxy-2-methylpropiophenone, 4-isopropyl-2-hydroxy-2-methylpropiophenone, and 1,1-dichloroacetophenone; and thioxanthone derivatives such as 2-chlorothioxanthone, 2-methylthioxanthone, and 2-isopropylthioxanthone.

Examples of the polymerization inhibitor include trihydrobenzene, toluhydroquinone, 14-naphthoquinone, parabenzoquinone, hydroquinone, benzoquinone, hydroquinone monomethyl ether, p-tert-butylcatechol, and 2,6-di-tert-butyl-4-methylphenol. Preferably, the polymerization inhibitor is added to the composition in a concentration of 10 to 1,000 ppm.

The composition according to the present invention can be cured within 2 hours in a temperature range of $-30°$ C. to $50°$ C. using a known redox catalyst or amine catalyst including a curing agent and a curing accelerator in combination.

In the present invention, in addition to the above components, various additives such as fillers, ultraviolet absorbers, pigments, heat-shielding pigments, thickeners, low-shrinking agents, antioxidants, plasticizers, aggregates, flame retardants, stabilizers, and fiber reinforcing materials can be used.

Examples of the filler include hydraulic silicate materials, a calcium carbonate powder, clay, an alumina powder, a silica stone powder, talc, barium sulfate, a silica powder, a glass powder, glass beads, mica, aluminum hydroxide, cellulose, silica sand, quartz sand, river sand, white limestone, crystalline limestone chips, crushed stone, and materials obtained by firing and hardening a colored green body for pottery or porcelain and crushing the resulting fired body.

As the filler for imparting thixotropy, asbestos, sepiolite, and a silica powder such as Aerosil can be added. As the filler, in addition to the above fillers, color pigments, heat-shielding pigments, and dyes can be used. Examples of these include titanium oxide, barium sulfate, carbon black, chrome vermillion, bengara, ultramarine, cobalt blue, phthalocyanine blue, and phthalocyanine green. The amount of filler added is 1 to 500 parts by mass per 100 parts by mass of the composition according to the present invention. The resulting mixture can be used for coating.

In order to stabilize adhesiveness to a base and to improve the durability of the adhesion strength with the filler, a silane coupling agent such as γ-methacryloxypropyltrimethoxysilane, γ-glycidoxypropyltrimethoxysilane, N-β-(aminoethyl)-γ-aminopropyltrimethoxysilane, or γ-mercaptopropyltrimethoxysilane can be added to the composition according to the present invention.

As a coating material according to the present invention, the urethane (meth)acrylate resin composition is used alone, or by adding any of the various additives described above.

The amount of the composition according to the present invention applied onto a concrete base as a solution is 500 to 2,000 g/cm$^2$ and preferably 800 to 1,200 g/cm$^2$. As coating means, a brush, a roll, a spray gun, and the like can be used. The concrete base may include an asphalt portion or a metal portion in addition to a concrete portion.

The urethane (meth)acrylate resin composition according to the present invention is applied as a coating material onto the concrete base directly or with a primer therebetween using the above coating means. Optionally, a cured product layer formed of a resin composition containing a vinyl ester resin that is at least one selected from an epoxy (meth)acrylate resin, a polyester (meth)acrylate resin, and a urethane (meth)acrylate resin and that is dissolved in the polymerizable unsaturated monomer (B); or a pavement layer can be formed on the coating film.

The pavement layer includes an asphalt composition produced by mixing an asphalt paving material, or asphalt, and a selected aggregate at a heating temperature of 150° C. to 260° C. or preferably 150° C. to 180° C., laying the mixture on a layer, and compacting the mixture with a motorized roller. Examples of the asphalt include natural asphalts such as lake asphalt, rock asphalt, and asphaltite; petroleum asphalts such as straight asphalt and blown asphalt; semi-blown asphalt; hard asphalt; and asphalts modified by incorporating a thermosetting resin, a thermoplastic resin, a rubber, or the like in any of the above asphalts.

As the primer, any publicly known primer can be used. A resin-based primer can be preferably used.

EXAMPLES

The present invention will now be described in further detail with reference to Examples. In the following description, "parts" and "%" mean "parts by mass" and "% by mass", respectively.

Synthesis Example 1

Urethane Methacrylate Resin (a)

Into a 1-liter four-necked flask equipped with a thermometer, a stirrer, an inert gas inlet, an air inlet, and a reflux condenser, 500 g of polytetramethylene glycol (hereinafter, abbreviated as "PTMG") having a number-average molecular weight of 1,000 and 174 g of tolylene diisocyanate (hereinafter, abbreviated as "TDI") were charged and caused to react for 4 hours in a nitrogen stream at 80° C. Since the NCO equivalent substantially reached a theoretical equivalent of 600, the mixture was cooled to 50° C. In an air stream, 0.07 g of hydroquinone was added, and 100 g of 2-hydroxyethyl methacrylate (hereinafter abbreviated as "HEMA") and 56 g of pentaerythritol triallyl ether were added. The resulting mixture was caused to react for 5 hours at 90° C. At the point of time when the NCO % reached 0.1% or less, 0.07 g of tertiary butyl catechol (abbreviated as "TBC") was added. Thus, a urethane methacrylate resin (a) having a number-average molecular weight of 1,666 was obtained.

Synthesis Example 2

Urethane Methacrylate Resin (b)

In the same manner as in Synthesis example 1 described above, a urethane methacrylate resin (b) having a number-average molecular weight of 1,608 was synthesized using polypropylene glycol (abbreviated as "PPG") having a number-average molecular weight of 1,000, TDI, and HEMA at the same mixing ratio as that of Synthesis example 1.

[Preparation of Resin Composition]

Seventy parts of the urethane methacrylate resin (a) or (b) and 30 parts of methacrylic acid (abbreviated as "MMA") were mixed. In the mixture, 0.2 parts of paraffin wax was dissolved. In a radical-curable resin composition produced by mixing the above mixture with 0.5 parts of 8% cobalt octoate and 1.0 parts of curing accelerator (N,N-bis-2-hydroxyethyl-p-toluidine), a polymerization inhibitor was added so that the gelation time in accordance with JIS K6901 5.10 was 15 to 20 minutes when 2 parts of Nyper NS (manufactured by NOF Corporation, benzoyl peroxide 40%) was added.

The urethane methacrylate resin compositions for which the amounts of polymerization inhibitor had been determined were prepared in accordance with Table 1. Then, the following evaluations were performed.

Method for Testing Surface-drying Property

The urethane methacrylate resin composition with a gelation time set to be 15 to 20 minutes was mixed with 8% cobalt octoate, a curing accelerator (N,N-bis-2-hydroxyethyl-p-toluidine), and 40% benzoyl peroxide. The mixture was stirred under the conditions of 1,000 rpm and 60 seconds with a disper. The stirred material was applied onto a slate plate with a brush in an amount of 1.0 kg/m² or 2.0 kg/m². Then, tack-free time was measured.

Method for Testing Slidability of Coating Film

One hour after confirming that the coating film had dried, the presence or absence of bleeding was determined by touching the surface of the coating film with fingers. If bleeding is present, although no fingerprints are left on the surface of the coating film since the surface is cured (dried), presence of bleeding, that is sliminess, is sensed.

Method for Testing Pinhole Resistance

Into the resin composition with a gelation time set to be 15 to 20 minutes, 8% cobalt octoate, a curing accelerator (N,N-bis-2-hydroxyethyl-p-toluidine), and 40% benzoyl peroxide were mixed. The mixture was stirred under the conditions of 1,000 rpm and 60 seconds with a disper. The stirred material was applied onto a slate plate with a brush in an amount of 1.0 kg/m² or 2.0 kg/m². After curing and drying, the appearance of the coating film was observed.

Examples 1 to 10

A urethane methacrylate resin composition is prepared using the urethane methacrylate resin (a) or (b) according to the above Synthesis examples in accordance with the formation shown in Table 1. The resin composition was applied onto a slate plate with a brush in an amount of 1.0 kg/m² or 2.0 kg/m². Thus, a cured coating film layer having a thickness of 1 mm and 2 mm was formed. By visually inspecting the surface of the coating film, a surface-drying property test, a coating film slidability test, and a pinhole resistance test were performed.

Comparative Examples 1 to 5

A resin composition is prepared using the urethane methacrylate resin (a) or (b) shown in Synthesis examples in accordance with the formation shown in Table 2. The resin compositions was applied onto a slate plate with a brush in an amount of 1.0 kg/m² or 2.0 kg/m². Thus, a cured coating film layer was formed. The below-described surface-drying property test, coating film slidability test, and pinhole resistance test were performed.

TABLE 1

|   |   | Example 1 | Example 2 | Example 3 | Example 4 | Example 5 | Example 6 | Example 7 | Example 8 | Example 9 | Example 10 |
|---|---|---|---|---|---|---|---|---|---|---|---|
| A | Resin a | 70 | 70 | 70 | 70 | 70 | 70 | 70 | 70 | | |
|   | Resin b | | | | | | | | | 70 | 70 |
| B | MMA | 30 | 30 | 30 | 30 | 30 | 30 | 30 | 30 | 30 | 30 |
| C | Paraffin wax | 0.2 | 0.2 | 0.2 | 0.2 | 0.5 | 0.1 | 0.2 | 0.2 | 0.2 | 0.2 |
| D | HC-40 | | | | | | | | 0.2 | 1 | |
|   | HC-100 | 0.2 | 0.2 | 0.01 | 2 | 0.01 | 2 | | | 0.2 | 0.2 |
|   | C/D | 1 | 1 | 20 | 0.1 | 50 | 0.05 | 1 | 0.2 | 1 | 1 |
|   | 8% Cobalt octoate | 0.5 | 0.5 | 0.5 | 0.5 | 0.5 | 0.5 | 0.5 | 0.5 | 0.5 | 0.5 |
|   | Curing accelerator | 1 | 1 | 1 | 1 | 1 | 1 | 1 | 1 | 1 | 1 |
|   | 40% BPO | 2 | 2 | 2 | 2 | 2 | 2 | 2 | 2 | 2 | 2 |
|   | Surface-drying property (1 kg/m2) | Good | Good | Good | Good | Good | Good | Good | Good | Good | Good |
|   | Surface-drying property (2 kg/m2) | Good | Good | Good | Good | Good | Good | Good | Good | Good | Good |
|   | Slidability of coating film (1 kg/m2) | Good | Good | Good | Good | Good | Good | Good | Good | Good | Good |
|   | Slidability of coating film (2 kg/m2) | Good | Good | Good | Good | Good | Good | Good | Good | Good | Good |
|   | Pinhole resistance (1 kg/m2) | Good | Good | Good | Good | Good | Good | Good | Good | Good | Good |
|   | Pinhole resistance (2 kg/m2) | Good | Good | Good | Good | Good | Good | Good | Good | Good | Good |

MMA: Methyl methacrylate
HC-40: "LUCANT", manufactured by Mitsui Chemicals, Inc., ethylene-α-olefin co-oligomer, number-average molecular weight; 1,000
HC-100: "LUCANT", manufactured by Mitsui Chemicals, Inc., ethylene-α-olefin co-oligomer, number-average molecular weight; 1,500
8% Cobalt octoate: cobalt octoate solvent solution containing 8% cobalt
Curing accelerator: N,N-bis-2-hydroxyethyl-p-toluidine
40% BPO: benzoyl peroxide 40% solution <Method for Determining Number-average Molecular Weight>

The number-average molecular weights of PTMG, PPG, urethane methacrylate resin (a), urethane methacrylate resin (b), HC-40, and HC-100, which were used in Synthesis examples, Examples, and Comparative examples, were determined under the following measurement conditions. (Measuring Equipment) Integrated GPC system, manufactured by Tosoh Corporation Instrument: HLC-8220GPC
Detector: RI (differential refractometer)
Column: TSK-gel G5000HxL (7.8×300 mm)×1
G4000HxL (7.8×300 mm)×1
G4000HxL (7.8×300 mm)×1
G4000HxL (7.8×300 mm)×1
Mobile phase: Tetrahydrofuran
Flow rate: 1.0 mL/min
Temperature: 40° C.
Injection volume: 100 μL (sample concentration: 0.4%)
Polystyrene equivalent average molecular weight
Polystyrene: TSK standard polystyrene, manufactured by Tosoh Corporation <Evaluation of Surface-drying Property Test>
Good: Tack-free within 30 minutes
Fair: Tack-free after 30 minutes but before 45 minutes
Poor: Tack-free at or after 45 minutes <Evaluation of Coating Film Slidability (Sliminess) Test>
Good: Bleeding is not present
—: Cannot be examined because the coating film has not dried for 2 hours or more.
Poor: Bleeding is present <Evaluation of Pinhole Resistance Test>
Good: Pinholes are not present
Fair: Partially-penetrating pinholes are present
Poor: Pinholes are present Since the ethylene-α-olefin co-oligomer is not contained in Comparative examples 1 and 5, the coating film with a thickness of 1 mm had poor surface-drying property, as well as a poor pinhole resistance. Since C/D was out of the range in Comparative examples 2 and 3, any of surface-drying property, slidability of the coating film, or pinhole resistance was poor. Since the paraffin wax was not contained in Comparative example 4, the surface-drying property and slidability of the coating film were poor.

Industrial ApplicabilitY

According to the present invention, it is possible to provide a urethane methacrylate resin composition that forms a coating film with excellent surface-drying property, slidability, and pinhole resistance, and a coating material using the urethane methacrylate resin composition.

The invention claimed is:

1. A urethane (meth)acrylate resin composition comprising:
   a urethane (meth)acrylate resin (A),
   a polymerizable unsaturated monomer (B),
   a paraffin wax (C), and
   an ethylene-α-olefin co-oligomer (D),
   wherein a mass ratio of the paraffin wax (C) to the ethylene-α-olefin co-oligomer (D) is 0.05 to 50,
   wherein an amount of the paraffin wax (C) added is 500 to 10,000 ppm relative to 100 parts by mass in total of the urethane (meth)acrylate resin (A) and the polymerizable unsaturated monomer (B),
   wherein an amount of the ethylene-α-olefin co-oligomer (D) is 0.01 to 2 parts by mass relative to 100 parts by mass in total of the urethane (meth)acrylate resin (A) and the polymerizable unsaturated monomer (B), and
   wherein a mixing ratio (mass %) of the urethane (meth)acrylate resin (A) and the polymerizable unsaturated monomer (B) is (A)/(B)=30/70 to 70/30,
   wherein a number-average molecular weight of the ethylene-α-olefin co-oligomer (D) is 500 to 2,500.

2. The urethane (meth)acrylate resin composition according to claim 1, wherein the urethane (meth)acrylate resin (A) is obtained by reacting a terminal hydroxyl group of a polyether polyol (A-1) with a polyisocyanate (A-2), and reacting the resulting product with a hydroxyl group-containing (meth)acrylate compound (A-3).

3. A coating material comprising the urethane (meth)acrylate resin composition according to claim 1.

TABLE 2

| | | Comparative example 1 | Comparative example 2 | Comparative example 3 | Comparative example 4 | Comparative example 5 |
|---|---|---|---|---|---|---|
| A | Resin a | 70 | 70 | 70 | 70 | |
| | Resin b | | | | | 70 |
| B | MMA | 30 | 30 | 30 | 30 | 30 |
| C | Paraffin wax | 0.2 | 0.8 | 0.1 | 0 | 0.2 |
| D | BYK A555 | | | | | 0.2 |
| | HC-100 | — | 0.01 | 3 | 0.2 | — |
| | C/D | 0 | 80 | 0.03333 | 0 | 0 |
| | 8% Cobalt octoate | 0.5 | 0.5 | 0.5 | 0.5 | 0.5 |
| | Accelerator | 1 | 1 | 1 | 1 | 1 |
| | 40% BPO | 2 | 2 | 2 | 2 | 2 |
| | Surface-drying property (1 kg/m2) | Fair | Good | Fair | Poor | Poor |
| | Surface-drying property (2 kg/m2) | Good | Good | Fair | Poor | Fair |
| | Slidability of coating film (1 kg/m2) | Good | Good | Poor | — | Good |
| | Slidability of coating film (2 kg/m2) | Good | Good | Poor | — | Good |
| | Pinhole resistance (1 kg/m2) | Poor | Poor | Good | Good | Poor |
| | Pinhole resistance (2 kg/m2) | Poor | Poor | Good | Good | Poor |

4. The urethane (meth)acrylate resin composition according to claim 1, wherein the number-average molecular weight of the ethylene-α-olefin co-oligomer (D) is 1,000 to 1,500.

* * * * *